No. 728,932. PATENTED MAY 26, 1903.
H. JORDAN.
LAND SCORER, BALLAST DRESSER, AND WEED CUTTER.
APPLICATION FILED NOV. 19, 1901.
NO MODEL.
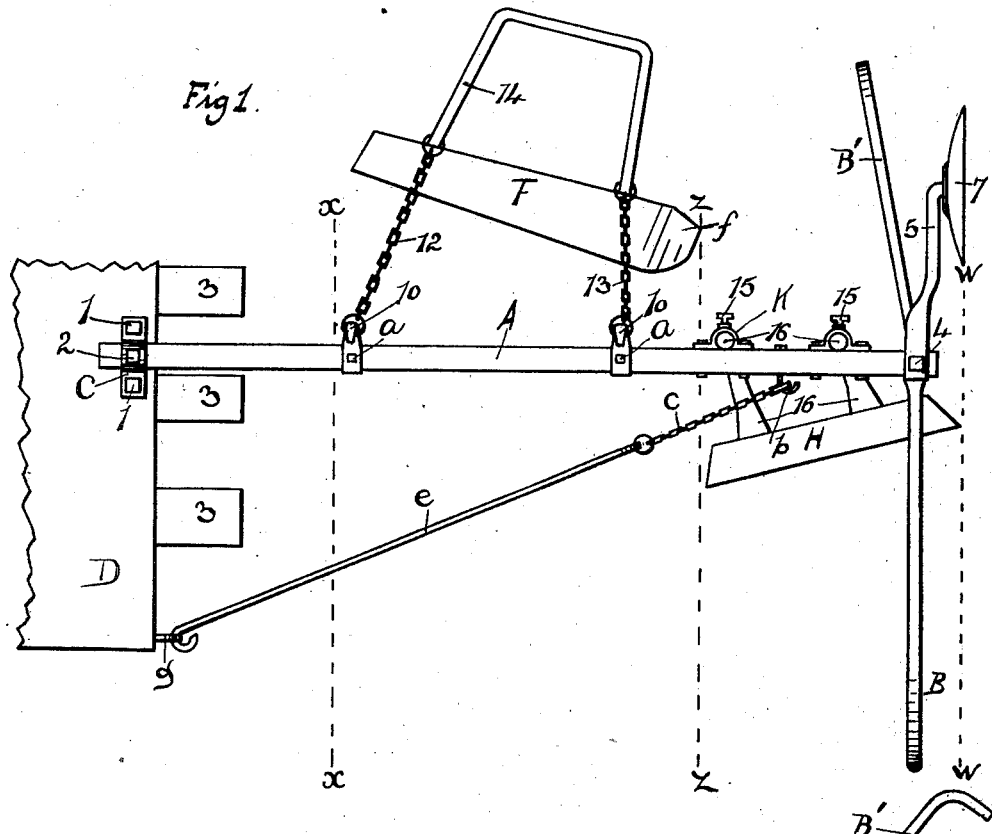
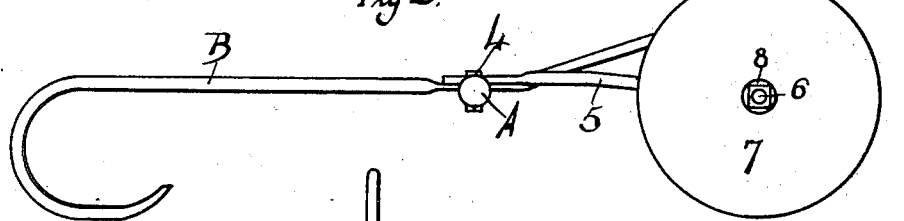
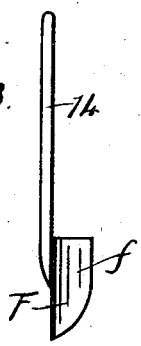
WITNESSES:
F. J. Larson.
E. A. Sprecher.
INVENTOR:
Henry Jordan.
PER. Geo. W. Sues.
ATTY.

No. 728,932. Patented May 26, 1903.

UNITED STATES PATENT OFFICE.

HENRY JORDAN, OF KEARNEY, NEBRASKA.

LAND-SCORER, BALLAST-DRESSER, AND WEED-CUTTER.

SPECIFICATION forming part of Letters Patent No. 728,932, dated May 26, 1903.

Application filed November 19, 1901. Serial No. 82,951. (No model.)

*To all whom it may concern:*

Be it known that I, HENRY JORDAN, residing at Kearney, in the county of Buffalo and State of Nebraska, have invented certain useful Improvements in Land-Scorers, Ballast-Dressers, and Weed-Cutters; and I do hereby declare that the following is a full, clear, and exact description of the invention, such as will enable others skilled in the art to which it appertains to make and use the same, reference being had to the accompanying drawings, which form a part of this specification.

This invention relates to a new and novel land-scorer, ballast-dresser, and weed-cutter.

The object of my invention is to provide a device adapted to be secured to a railroad-car and be propelled by the same to score the land to mark the width of the dressing and provide a means whereby the ballast may be dressed toward the rail or toward the mud-shoulder, and further provide a weed-cutter to mark the mud-shoulder, as will be described more fully hereinafter.

In the accompanying drawings I have shown in Figure 1 a top view, with portions removed, of a machine embodying my invention. Fig. 2 shows a detached view disclosing the operating-handle, while Fig. 3 shows an end view of the scraper used in dressing the ballast.

My invention embodies a suitable main supporting-bar A, to which is secured at one end a runner B, this runner supporting the main bar A at one end, the remaining end of the bar being secured within the bearing C, which bearing, by means of the bolts 1, is secured to a suitable hand-car D, a broken portion of which is shown. This bar A may be removably secured within the bearing C by means of the set-screw 2, so that this main bar A may be readily removed from the car or shoved inward or outward.

The runner B is secured to the bar A by means of a suitable nut-provided bolt 4, and this bolt at the same time pivotally secures the bracket 5, which bracket is provided with an axle 6, supporting a cutter-disk 7, secured by means of the nut 8. The runner B is projected rearward beyond the bar A and is provided with the operating-handle B', so that this cutter-provided runner may be controlled by means of the operating-handle B'. Secured to this main bar A at suitable points are the collar-hooks 10, these hooks 10 being held by means of the bolts a, as shown in Fig. 1. Secured to these hooks 10 10 are the chains 12 and 13, the chain 12 being slightly longer than the chain 13, as shown. These chains 12 and 13 are secured to the bale or handle 14 of a scraper F F, having one end, as shown at f, slightly curved outward, as is shown in Fig. 3. This scraper is removably secured to the hooks by means of the chains 12 and 13.

Upon one side I provide the main supporting-bar A with the eyes K, provided with the set-screws 15, which hold the stems 16 of the side cutter H, as is shown in Fig. 1, so that this side cutter H may be raised or lowered and so be adjustably held. At a suitable point this bar A is further provided with the hook b, from which extends a chain c, secured to the hook-ended bar e, which works through a suitable eyelet g, secured to the hand-car D, as is shown.

It is desirable in order to prevent fires adjacent the ties in connection with railways to keep the ground adjacent to the track clear of weeds and other matter that would be likely to become dry and inflammable. It is further desirable to keep the ballast of the road-bed evenly dressed, this being especially essential when the rails are upon an elevated road-bed, so that the ballast will not work too far away from the ties. It is always desirable that the strip adjacent to the ballast, which is known as the "mud-shoulder," should be kept clear of growing weeds, while for the sake of appearance it is desirable to clearly mark the line between the mud-shoulders and the remaining portion of the right of way. This may be readily accomplished by means of my land-scorer, ballast-dresser, and weed-cutter.

In my invention the bar A is secured to a hand-car or locomotive-propelled vehicle and is slowly pushed or dragged forward. An operator walks behind the main bar A with one hand upon the handle B' and the other guiding the scraper F by means of the bail or handle 14, so that as the car D is carried forward the ballast will be dressed toward the ties 3. The knife H has been previously set to cut all the weeds upon the mud-shoulder, which is shown between the dotted lines Z and W, while the ballast is that portion between lines X and Z, as shown in dotted lines in Fig. 1. While the weeds upon the mud-shoulder are cut by the blade or cutter H, the disk 7 cuts such weeds or vegetation as lean over, while at the same time scoring the land to distinctly show the end of the mud-shoulder. As shown in Fig. 1, the scraper F is shown to feed and dress the ballast toward the ties 3. If it should be desired to dress the ballast toward the mud-shoulder, it is simply necessary to reverse the chains 12 and 13. By this means it will be noticed that the weeds upon the mud-shoulder are cut, while the ballast may be dressed toward or from the rails. The scattered ballast is thus evenly distributed and the road-bed kept in proper condition.

Having thus described my said invention, what I claim as new, and desire to secure by United States Letters Patent, is—

In a device of the character described, the combination with a suitable railway-car, of a bearing provided with a set-screw secured to said car, a supporting-bar adjustably held within said bearing and projecting laterally from said car, a runner secured to the outer end of said bar having its forward end recurved and its rear end extending upward and rearward to form a guiding-handle, a bracket adjustably secured to said bar, a cutter-disk secured to said bracket adapted to travel in a line extending parallel to the advance of aforesaid car, two hooks secured to aforesaid bar and extending rearward, two chains of unequal length secured to said hooks, a scraper, a handle secured to said scraper, said chains being secured to said handle, to hold said scraper at an angle to said supporting-bar, eyes secured near the outer end to said bar, set-screws within said eyes, a cutter provided with upwardly-extending stems adapted to be adjustably secured within said set-screw-provided eyes, and a bar extending from near the outer end of said bar and secured to aforesaid car, all arranged substantially as and for the purpose set forth.

Signed in the presence of two witnesses.

HENRY JORDAN.

Witnesses:
N. P. McDONALD,
GILBERT E. HAASE.